Nov. 24, 1931.    G. E. GILMARTIN    1,833,212
COMBINATION SPOON CONTENTS LEVELER AND DIVIDER
Original Filed July 3, 1929
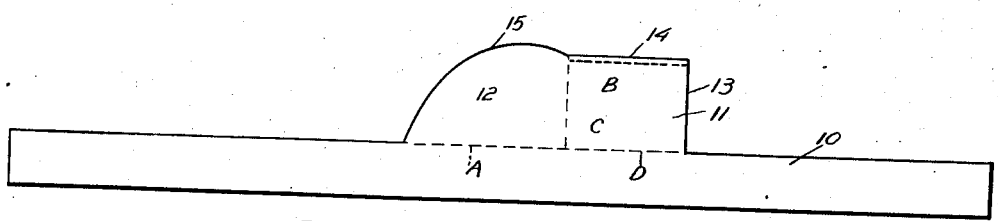
Fig. 1.
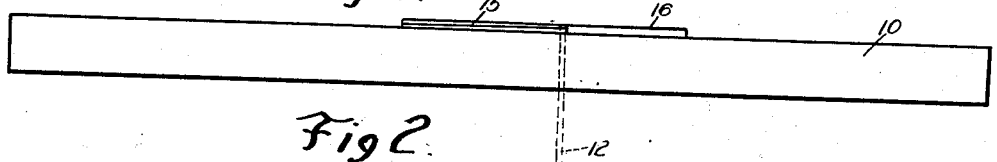
Fig. 2.
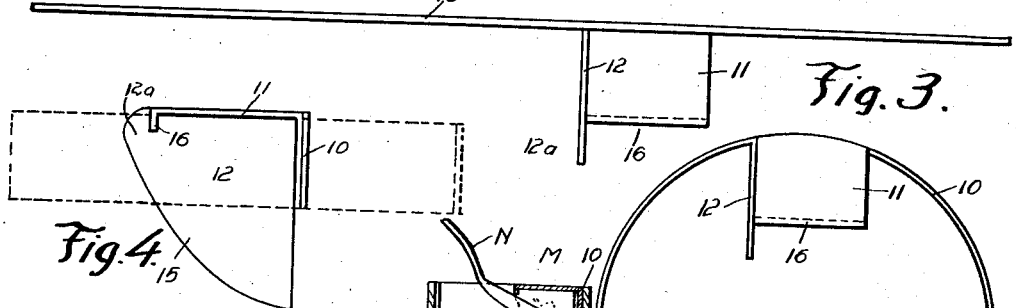
Fig. 3.
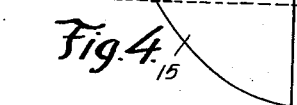
Fig. 4.
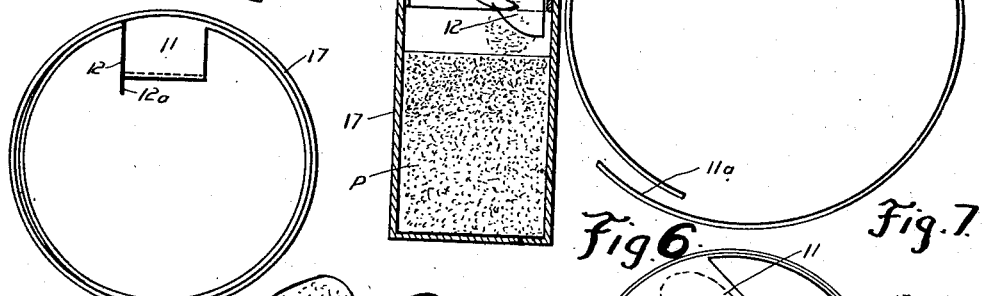
Fig. 6.    Fig. 7.
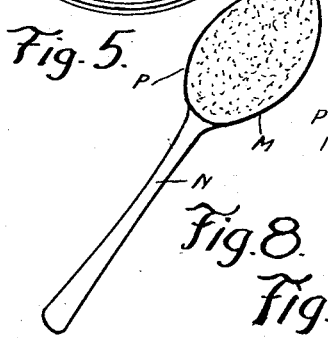
Fig. 5.    Fig. 8.    Fig. 9.
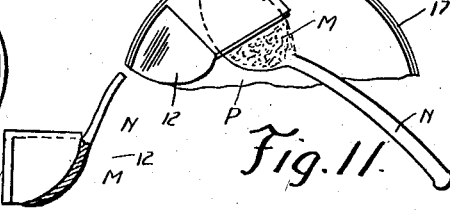
Fig. 10    Fig. 11.
Gladys E. Gilmartin Patented Nov. 24, 1931

1,833,212

UNITED STATES PATENT OFFICE

GLADYS E. GILMARTIN, OF LOS ANGELES, CALIFORNIA

COMBINATION SPOON CONTENTS LEVELER AND DIVIDER

Application filed July 3, 1929, Serial No. 375,820 Renewed May 1, 1931.

This invention relates to improvements in kitchen equipment and more particularly to implements used in connection with measuring out predeterminate portions or quantities of food ingredients incidental to making cakes, pies, and pastry in general.

One of the objects of the present invention is to provide a simple, efficient and inexpensive device designed for the purpose of leveling the contents of spoons, and then for enabling the contents of the spoon to be further reduced in quantity such as by dividing the contents into a one half portion or quantity.

It is well known that in the making of pies, cakes, and pastry in general recipes are usually followed by the housewife and the receipe may call for the use of a tablespoonful or half tablespoonful of baking powder or the like fine dry ingredients. The present invention aims effectively to bring about the saving of time in measuring out definite quantities of baking powder in spoons and aims also to accurately dole out the exact specific amount of baking powder or the like that the particular recipe calls for.

A further object of this invention is to provide a simple sheet metal stamping formed and shaped to provide in a unitary structure a device equipped with an integral plate against which a spoon containing baking powder or the like may be rubbed or wiped to level the contents thereof so when a recipe calls for a teaspoonful of baking powder, or the like, and the teaspoon is dipped into the material in a receptacle or can the surplus material held in the spoon may be quickly removed by means of the present invention and thus leveled. Should the recipe call for half a teaspoonful of the same material then the teaspoon, after having been leveled may be presented against a divider member, forming part of my invention, and moved relatively thereto so that one half of the contents of the spoon is removed accurately therefrom.

A further object of the present invention is to provide for the leveling and dividing of the contents of the spoon directly in the can or receptacle containing the ingredients placed in the spoon to the end that any part of the ingredients removed from the spoon may fall back and be deposited in the same can from which it originally came and thus cause no waste of material.

A still further object of the present invention is to provide a sheet metal stamping or blank designed for the purpose of providing a leveling integral projection and another bent out and outstruck portion designed primarily for the purpose of dividing the ingredients of the spoon. The stamping is also bent to provide a split resilient band that will be frictionally and removably secured into the tubular body of the can of baking powder or the like.

Another feature of the present invention is the provision of an attachment to a baking powder can or receptacle whereby a spoon introduced into the can and removing part of the contents thereof may whilst still in position therein, be applied against a shelf projecting parallel with the floor of the can but at the upper end thereof, and wiped against the shelf to have surplus ingredients removed from the spoon, resulting in accurately leveling the contents thereof. Then whilst the same spoon is still over the can or in it and with the contents thereof smoothened out to represent an even teaspoonful, the filled spoon can be applied to a projection extending as a fin vertically in the can, and the spoon shifted relatively to the fin to divide the contents of the spoon so that one half of the contents remains in the spoon when it is removed from the can while the other half is deposited back into the can.

With the above and other objects in view my invention consists in the combination, arrangement and details of construction disclosed in the drawings and specification, and then more particularly pointed out in the appended claims.

In the drawings, wherein similar reference characters designate similar parts throughout the several views, Figure 1 is a plan view of the sheet metal blank from which my invention is made, Figure 2 is a plan view of the sheet metal blank showing the lateral portion bent upwardly, Figure 3 is an edge view of the sheet metal blank showing the laterally projecting part to be bent in ultimate positioning, Figure 4 is an end sectional view, showing the leveler and divider in end elevation, and showing the securing band in section, Figure 5 is an edge view of the complete device formed from the sheet metal blank, Figure 6 is a vertical sectional elevation of a can containing baking powder or the like showing the manner of applying the spoon for leveling purposes, Figure 7 is a top plan view of the can showing my invention applied in position thereupon, Figure 8 is a plan view of a spoon showing the contents thereof in leveled condition, Figure 9 is a plan view, partly in section, showing the manner in which part of my invention serves to divide the contents of the spoon, Figure 10 is a sectional detail view of the divider showing it in position over the spoon, Figure 11 is a fragmental perspective view of the can showing the spoon applied in leveling position.

In the drawings, which are merely illustrative of my invention the parts of my invention are clearly disclosed. A sheet metal blank is designed to be punched out to provide the shape of stamping shown in Figure 1, where it will be seen that there is provided a long, narrow strap, 10 which will be made preferably of spring metal so as to have a desirable degree of flexure. Formed as a lateral integral portion of this stamping will be an extension or projection which has a medial transverse score line C extending thereon for folding purposes. This will serve to divide this lateral integral portion into two separate and distinct parts designated 11 and 12 respectively, there being a slit A formed between the part 12 and the main strap 10 to allow this part 12 to fold upon the transverse score line C. When this folding shall have taken place the result will be to dispose the part 12 in a plane at right angles to the part 11. The piece 11 will now be folded upon the score line D which separates the parts 11 and 12 from the strap 10. Or the entire lateral projecting parts 11, 12 may fold together, by folding the part 11 upon the lines D; then the part 12 may be outstruck or bent at right angles to the part 11.

In Figure 3 it will be seen how the two parts are positioned relatively to each other, when ready to function. There is a narrow rightangular flange 16 formed terminally upon the part or plate, and the purpose of this flange is to provide the wiper edge for the particular spoon. The strap 10 will be coiled into a resilient split band expansible and contractable if desired, but shown to be contractable only; but parts may be telescoped if desired, in a manner not shown. With all of the parts arranged in their ultimate position, the spring band 10 will be snapped frictionally and removably into the upper end of say the baking powder containing can 17, holding the baking powder P. The band thus supported in the can, the plate 11 will be disposed parallel to the bottom of the can. The depending rightangular disposed portion 12 has a curved edge 15, and originally, before it was bent down from the elongated strap 10, the curved edge extended from the end of the score line C and until it intersected or joined one end of slit A. If desired this curve bulges out from the upper front edge of the table or plate 11 as shown in Fig. 4 and meets the rear edge of the plate or lug 12. The band positions the plate 11 and lug 12 directly in the can 17. A spoon N has a container M of conventional kind.

In operation the device is to be employed in the following manner: With the parts positioned as herein shown the spoon N will have its container dipped into the can 17 and hence powder P will be placed on the spoon container. The spoon filled with baking powder or the like will now have its outer edge wiped or rubbed against the flange 16 of the plate 11, and if it is found necessary the spoon may be tilted for this purpose. The surplus powder will be removed from the spoon completely and will fall back into the can or receptacle from which the powder was originally drawn. The spoon will now have its contents accurately leveled as shown in Figure 8.

If now it is desired to remove one half of the contents of the spoon to provide a half teaspoonful of the flour or baking powder or the like, the teaspoon filled with powder and leveled accurately will be presented in a horizontal position against the curved lug 12 and as the curve 15 of this lug conforms exactly to the curvature of the container of the spoon and especially corresponds with the medial longitudinal curvature of the spoon container, the spoon with the powder therein will be moved upwardly against the lug 12, and the lug caused to penetrate the central longitudinal part of the spoon container to divide the contents of the spoon in two. Then by shifting the spoon laterally the lug 12 will force one half of the powder to leave the spoon and fall back in the can, the other half remaining intact in the spoon when the latter is removed from the can. 12 designates the upper portion or corner part of the lug 12 where it projects in advance of the adjacent plate 11.

It will be seen from the foregoing that the device can readily be removed from the can by collapsing the band 10 and then lifting the device from the can. It can as quickly and easily be placed back again. I do not confine myself to the exact details of construction disclosed herein but claim all variations falling within the purview of the appended claims.

What I desire to claim and seek protection on is as follows:—

1. As a new article of manufacture a sheet metal stamping shaped to provide an expansible collar, an integral shelf formed upon the collar serving as a spoon wiper, and an integral means formed on the collar adjacent the wiper for engaging in the spoon to divide the contents thereof.

2. As a new article of manufacture a sheet metal stamping shaped to provide an integral projection in the form of a spoon wiper, another integral projection formed upon the stamping to the form of a depending lug shaped to the curvature of the spoon container to divide the contents of the spoon, and means for supporting the two projections in operative position.

3. As a new article of manufacture a sheet metal stamping having means for frictional engagement in the tubular wall of a can to be supported at the upper end thereof, an integral projection on the stamping projecting parallel with the bottom of the can and serving as a spoon wiper, to allow the edge of the spoon container to rub against itself to remove superfluous material in the spoon, and means disposed alongside the integral projection and projecting downwardly at right angles to the wiper and having an edge curved to fit snugly the longitudinal central surface of the spoon container to divide the contents of a spoon presented thereagainst.

4. As a new article of manufacture a sheet metal stamping having means for frictionally engaging the tubular wall of a can containing food powder, a shelf carried by said stamping disposed parallel to the bottom of the can but arranged at the top of the can, a flange formed upon the shelf and serving as a wiper for the edge of a spoon presented thereagainst, and a bent portion struck out from the sheet metal stamping at right angles to the shelf so as to be vertically disposed, this bent portion having an under edge curved to snugly fit the medial longitudinal surface of a spoon so when the spoon is presented thereagainst and moved laterally thereof the bent portion will separate some of the contents of the spoon.

5. As a new article of manufacture a sheet metal stamping shaped to provide integral means of attachment to a receptacle having dry contents removable by a spoon, integral means projectable into the interior of the receptacle against which may be rubbed the edge of a spoon to level the contents of the spoon taken from the receptacle, so surplusage may fall back into the receptacle, and means integrally carried by said stamping projecting vertically in the receptacle so that the contents carrying spoon may be presented thereagainst and have one half of the spoon contents removed from the spoon and lodged in said receptacle.

6. A device as described consisting of a split expansible and contractible band designed to be frictionally positioned in a can of baking powder and the like, means on said band projecting into the can against which the edge of a spoon may be rubbed to level the contents of the spoon, and an integrally bent projection on said band extending vertically of the can and presenting a curved edge to the spoon after being leveled can be engaged with the projection and moved relatively thereto to divide the contents of the spoon.

7. A device as described consisting of a split resilient band designed to be frictionally clamped onto a can of baking powder or the like, an integral plate formed upon the edge of the band, a rightangular flange formed upon the end of the plate, an integral lug also upon the end of the plate, an integral lug also bent from the edge of the band to engage the plate, and means whereby the lug may fit the curvature of a spoon to assist in dividing the contents thereof.

8. A device of the kind described consisting of a resilient split band, an integral plate formed as a bent portion upon the edge of the band, a rightangular flange formed upon the said plate, another part bent back upon the edge of the split band and extending in a plane at right angles to the plate and contacting the same, the last-named part having an under edge curving to snugly fit the container portion of a spoon.

9. A device as described consisting of a split resilient band, a bent back rectangular portion struck out from the edge of the band so as to be disposed parallel to the edge of the band, and a struck out and bent part projecting at right angles alongside the rectangular portion of the band and curving from its upper forward point clear to its lowermost point, the struck out part projecting below the plane of the band.

10. A device of the kind described consisting of a sheet metal blank consisting of an elongated strap formed on one edge with a laterally disposed projecting part, the projecting part having a medial transverse score line for folding purposes, there being a slit separating the strap proper from one of the portions of the projecting part flanking the transverse score line whereby the slit portion can be folded at right angles to the other unslitted portion of the projecting part, the unslit portion being bent at right angles to the plane of said strap, said strap being bent and shaped to provide a split band.

11. In a device as described a sheet metal strap having a lateral projecting part integral therewith, but slit a distance of one half its length, a score line being provided on the projecting part extending transversely thereof and intersecting the end of the slit to set apart on opposite sides thereof a rectangular portion, and another portion having an edge curving from the other end of the slit to intersect the other end of the score line.

In witness whereof she has hereunder set her hand this 3 day of June, 1929.

GLADYS E. GILMARTIN.